(12) United States Patent
Weng

(10) Patent No.: US 9,336,968 B2
(45) Date of Patent: May 10, 2016

(54) KEYBOARD AND METHOD FOR ASSEMBLING KEYBOARD AND PORTABLE ELECTRONIC DEVICE

(71) Applicant: Wistron Corporation, New Taipei (TW)

(72) Inventor: Cheng-Ying Weng, New Taipei (TW)

(73) Assignee: Wistron Corporation, New Taipei (TW)

( * ) Notice: Subject to any disclaimer, the term of this patent is extended or adjusted under 35 U.S.C. 154(b) by 376 days.

(21) Appl. No.: 13/898,134

(22) Filed: May 20, 2013

(65) Prior Publication Data

US 2014/0097072 A1 Apr. 10, 2014

(30) Foreign Application Priority Data

Oct. 4, 2012 (TW) .............................. 101136662 A

(51) Int. Cl.
| | |
|---|---|
| *H01R 13/70* | (2006.01) |
| *H01H 13/705* | (2006.01) |
| *H01H 13/88* | (2006.01) |
| *G06F 1/16* | (2006.01) |
| *G06F 3/02* | (2006.01) |

(52) U.S. Cl.
CPC ........... *H01H 13/705* (2013.01); *G06F 1/1662* (2013.01); *G06F 1/1666* (2013.01); *G06F 1/1669* (2013.01); *G06F 3/0202* (2013.01); *G06F 3/0221* (2013.01); *H01H 13/88* (2013.01); *Y10T 29/49105* (2015.01)

(58) Field of Classification Search
CPC .... H01H 13/705; H01H 13/88; G06F 1/1669; G06F 1/1666; G06F 3/0202; G06F 3/0221

USPC .......... 200/5 A; 361/679.14–679.17; 345/168
See application file for complete search history.

(56) References Cited

U.S. PATENT DOCUMENTS

| | | | | |
|---|---|---|---|---|
| 8,310,823 | B2 * | 11/2012 | Stoltz ....................... | 361/679.17 |
| 2004/0207979 | A1 * | 10/2004 | Sitalasai et al. ............... | 361/683 |
| 2009/0279238 | A1 * | 11/2009 | Kobayashi et al. ...... | 361/679.09 |

FOREIGN PATENT DOCUMENTS

TW 282108 7/1996

OTHER PUBLICATIONS

English language translation of TW 282108.

* cited by examiner

*Primary Examiner* — Felix O Figueroa
(74) *Attorney, Agent, or Firm* — Rabin & Berdo, P.C.

(57) ABSTRACT

A keyboard applicable to a portable electronic device includes a flexible circuit board, a plurality of keys, a flexible frame, a first support plate, and a second support plate. The flexible circuit board has a first and a second surface. The plurality of keys is disposed on the first surface. The flexible frame is disposed on the first surface and has a plurality of through holes for keys to pass through. The first support plate is disposed on the second surface, and a part of the periphery of the first support plate is connected to the flexible frame. The second support plate is disposed on the second surface and adjacent to the first support plate, and a part of the periphery of the second support plate is connected to the flexible frame. Additionally, also provided is a method for assembling a keyboard and a portable electronic device.

12 Claims, 4 Drawing Sheets

KEYBOARD AND METHOD FOR ASSEMBLING KEYBOARD AND PORTABLE ELECTRONIC DEVICE

CROSS-REFERENCES TO RELATED APPLICATIONS

This non-provisional application claims priority under 35 U.S.C. §119(a) on Patent Application No. 101136662 filed in Taiwan, R.O.C. on 2012 Oct. 4, the entire contents of which are hereby incorporated by reference.

BACKGROUND OF THE INVENTION

1. Technical Field

The present invention relates to a keyboard, and more particularly to a keyboard of a portable electronic device.

2. Related Art

Nowadays, notebooks (NBs) are becoming lightweight and thin, so that all the components are becoming thinner and thinner. However, when the materials become lightweight and thin, strength is often sacrificed. The keyboard is a typical example. The original support plate material has gradually changed from a 0.6-mm thick aluminum plate to a 0.2-mm thick stainless steel plate. Even if the material becomes the stainless steel with a relatively high strength, the overall strength is still lower. Consequently, some relevant tests and requirements become difficult to meet, while consumers also experience poor product quality. Therefore, an improved keyboard support plate is proposed, where the joint between an upper cover and a keyboard support plate is enhanced through the technique during assembling and a structure corresponding to the upper cover, so as to improve the overall quality.

In the process and technique of production line assembling of the portable electronic device, the keyboard is often assembled in the last several stages, and due to the limitation of the industrial design, the keyboard generally can only be assembled from outside surfaces, so that in addition to one or two rear locking screws, the keyboard can be fixed through ambient hook structures only. However, when the strength of the keyboard support plate is reduced due to the thickness decrease of the keyboard support plate and the area is increased as a numeric keypad is added, the keyboard cannot be firmly fixed only through the ambient hook structures.

One of the reasons why the keyboard cannot be firmly fixed on the portable electronic device only through the ambient hooks is that the length of the joint between the hook and a hole cannot be increased. The reason why the length cannot be increased is that when the keyboard is mounted on the portable electronic device, the hole on the electronic device is aligned with the hook over the electronic device, the hook is inserted into the hole, and then the hook slides a certain distance (generally, not greater than 3 mm), in the width direction or the length direction, so that the hook is locked in the hole, and the keyboard is fixed on the electronic device. However, in order to reach a smaller size of the electronic device, the width of the keyboard should be close to or equal to the width of the electronic device. The sliding distance required during the foregoing assembling of the keyboard causes difficulties for designers in reducing the width of the electronic device.

Additionally, that the keyboard is fixed on the electronic device only through the locking screw, also causes difficulties for designers wishing to reduce the thickness of the electronic device. Since elements with significant thickness, such as a hard disk or an optical disk drive, are often disposed inside the electronic device, if the keyboard is fixed completely through the locking screw, in order to reduce the thickness of the electronic device, the locking screw cannot be mounted at a position over the hard disk or the optical disk drive, thereby causing another design trouble.

Consequently, the keyboard and the method for assembling a keyboard in the prior art have the problem that it is difficult to further make a portable electronic device thinner and narrower.

SUMMARY

In view of this, the present invention provides a keyboard, applicable to a portable electronic device. The keyboard includes a flexible circuit board, a plurality of keys, a flexible frame, a first support plate, and a second support plate. The flexible circuit board has the shape of a thin plate and a first surface and a second surface opposite the first surface. The plurality of keys is disposed on the first surface of the flexible circuit board and is electrically connected to the flexible circuit board. The flexible frame is disposed on the first surface of the flexible circuit board and has a plurality of through holes for the keys to pass through. The first support plate and the second support plate are used to enable the keyboard to have certain rigidity. The first support plate is disposed on the second surface of the flexible circuit board, and a part of the periphery of the first support plate is connected to the flexible frame. The second support plate is disposed on the second surface of the flexible circuit board and is adjacent to the first support plate, and a part of the periphery of the second support plate is connected to the flexible frame.

A conventional keyboard has an integrated support plate, so the support plate cannot be bent at a large angle. One concept of the present invention is that the support plate is divided into two parts, so that an angle can be formed between the second support plate and the first support plate, thereby achieving the convenience during assembling.

The present invention also provides a method for assembling a keyboard, applicable to a portable electronic device. The portable electronic device has an opening and two trenches parallel to each other. The two trenches are disposed on the periphery of the opening.

The method uses the keyboard described previously. The first support plate and the second support plate of the keyboard are both rectangular. The first support plate has three convex edges and a flat edge, the three convex edges of the first support plate extend in the thickness direction of the first support plate and are connected to the flexible frame, and the flat edge of the first support plate is opposite the second support plate; additionally, the first support plate further includes two flanges parallel to each other, and the two flanges are disposed on the periphery of the first support plate and used to slide into the two trenches of the portable electronic device. The second support plate also has three convex edges and a flat edge, the three convex edges of the second support plate extend in the thickness direction of the second support plate and are connected to a part of the periphery of the frame, and the flat edge of the second support plate is opposite the flat edge of the first support plate.

When the keyboard is intended to be assembled on the portable electronic device, the keyboard may be first bent along the flat edge of the first support plate or the flat edge of the second support plate, so that an angle is formed between the second support plate and the first support plate. Then, the two flanges of the first support plate slide into the two trenches of the portable electronic device. Next, the first support plate and the second support plate are level with each other. Finally, the second support plate is fixed on the portable electronic device.

In conclusion, through the bendable keyboard of the present invention, the problem in the prior art that it is difficult to further make the portable electronic device thinner or narrower can be solved.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1:
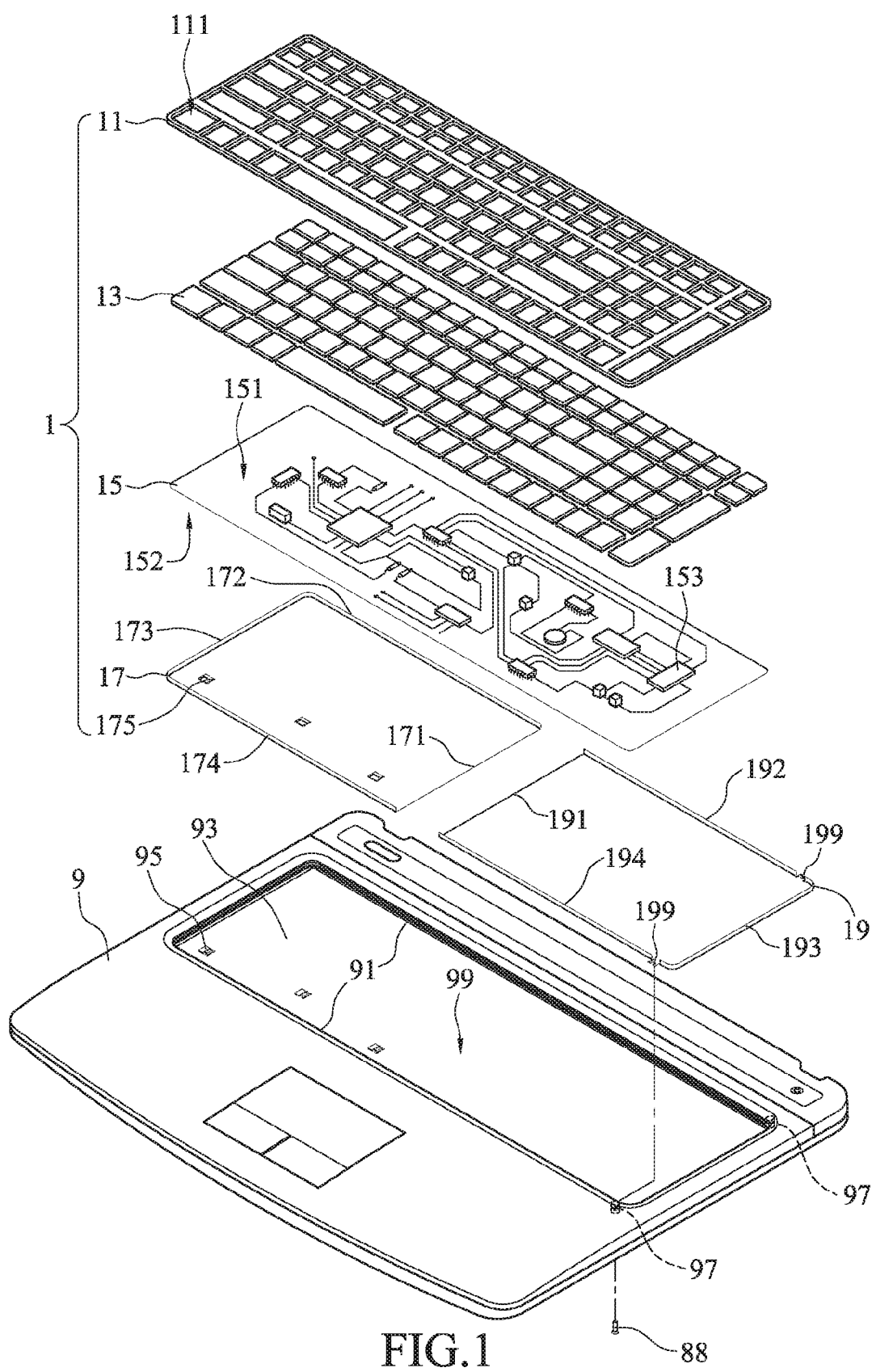
FIG. 1 is an exploded view of a specific embodiment of the present invention.

FIG. 1 is an exploded view of a specific embodiment of the present invention. Please refer to FIG. 1, in which a keyboard 1 applicable to a portable electronic device 9 is disclosed. The keyboard 1 includes a flexible circuit board 15, a plurality of keys 13, a flexible frame 11, a first support plate 17, and a second support plate 19.

The flexible circuit board 15 has a first surface 151 and a second surface 152 opposite the first surface and has the shape of a flat plate. The first surface 151 is arranged with electronic elements and circuits 153 that are required for work and is flexible, so that when the first surface 151 is bent due to an external force, no damages occurs in the circuit or structure.

The plurality of keys 13 is disposed on the first surface 151 of the flexible circuit board 15, and is electrically connected to the electronic elements and the circuits on the flexible circuit board 15.

The flexible frame 11 is disposed on the first surface 151 of the flexible circuit board 15, and is provided with a plurality of through holes 111 for the plurality of keys 13 disposed on the first surface 151 to pass through.

The first support plate 17 is disposed on the second surface 152 of the flexible circuit board 15, and a part of the periphery of the first support plate 17 is connected (for example, welded) to a part of the periphery of the flexible frame 11. The first support plate 17 of this embodiment is a metal material (for example, stainless steel), is rectangular, and has three convex edges 172, 173, and 174 and a flat edge 171. The three convex edges 172, 173, and 174 extend in the thickness direction of the first support plate 17 and are connected to the flexible frame 11, and the flat edge 171 is opposite the second support plate 19.

The second support plate 19 is disposed on the second surface 152 of the flexible circuit board 15 and is adjacent to the first support plate 17, and a part of the periphery of the second support plate 19 is connected (for example, welded), to a part of the periphery of the flexible frame 11. The second support plate 19 of this embodiment is a metal material (for example, stainless steel), is rectangular, and has three convex edges and a flat edge. The three convex edges 192, 193, and 194 of the second support plate 19 extend in the thickness direction of the second support plate 19 and are connected to the flexible frame 11, and the flat edge 191 of the second support plate 19 is opposite the flat edge 171 of the first support plate 17.

In an implementation aspect, the portable electronic device 9 has an opening 99 and two trenches 91 parallel to each other. The two trenches 91 are disposed on the periphery of the opening 99. Two convex edges 172 and 174 of the first support plate 17 are parallel to each other. When the keyboard 1 is assembled on the portable electronic device 9, the two convex edges 172 and 174 may be used to slide into the two trenches 91, so that the first support plate 17 is fixed to the portable electronic device 9.

In an implementation aspect, the portable electronic device 9 has an opening 99 and a fixing piece 93. The fixing piece 93 is disposed at the opening 99 and the surface of the fixing piece 93 has a plurality of holes 95. The first support plate 17 includes a plurality of hooks 175 (three hooks in FIG. 1), corresponding to the holes 95. When the keyboard 1 is assembled on the portable electronic device 9, each hook 175 is locked in each hole 95.

Figure 2:
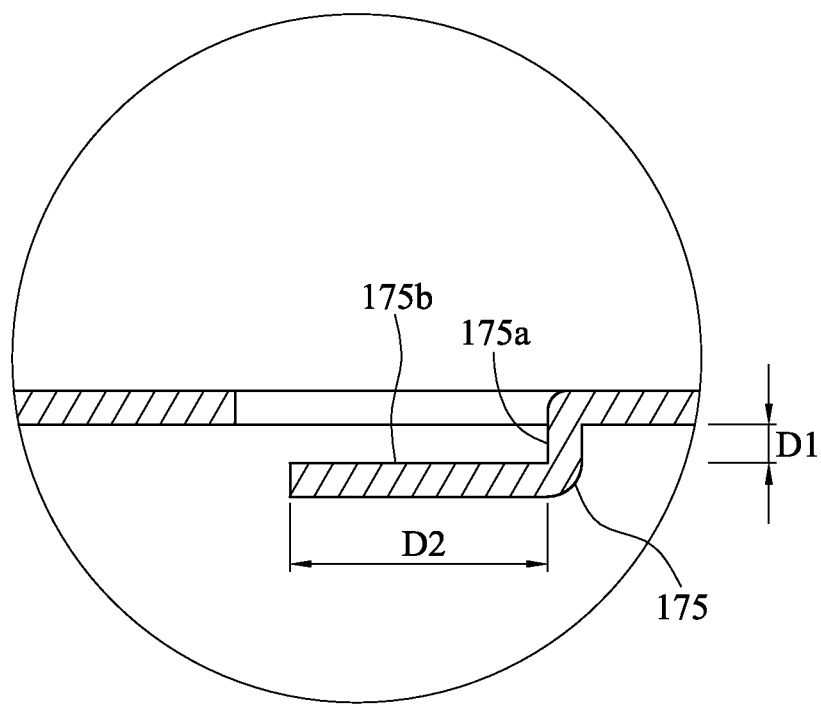
FIG. 2 is a partial enlarged view of a specific embodiment of the present invention.

FIG. 2 is a partial enlarged view of the present invention. Please refer to FIG. 2, a hook 175 is disclosed. The hook has a first extension portion 175a and a second extension portion 175b. The first extension portion 175a extends a first distance D1 in the direction substantially perpendicular to the first support plate 17 and is connected to an end of the second extension portion 175b. The second extension portion 175b extends a second distance D2 in the direction substantially parallel to the first support plate 17. In this implementation aspect, when the keyboard 1 is assembled on the portable electronic device 9, the hook 175 is locked in the hole 95 through the second extension portion 175b. Compared with the prior art, the second distance D2 of this implementation aspect is longer and may reach the range from 5 mm to 15 mm. In other implementation aspects, the second distance D2 may be further increased as required, so as to increase the joining force between the keyboard 1 and the portable electronic device 9.

It should be specially noted that one basic concept of this embodiment is that, the first support plate 17 and the second support plate 19 that are separate from each other are used to achieve the purpose of a bendable keyboard 1. The sizes of the first support plate 17 and the second support plate 19 may vary according to the considerations for element arrangement of designers. For example, the first support plate 17 may be arranged above a thicker component (for example, a hard disk or an optical disk drive), of the portable electronic device 9. That is because that the first support plate 17 is connected to the two trenches 91 through two convex edges 172 and 174, or the hook 175 is locked in the hole 95, or even the first support plate 17 is fixed onto the portable electronic device 9 in a manner of joining a convex edge and a trench and joining a hook and a hole at the same time. Compared with the locking manner, neither the manner of joining a convex edge and a trench nor the manner of joining a hook and a hole occupies a large space in the vertical direction, so that a thicker component is allowed to be disposed below the first support plate 17. The second support plate 19 is locked through a locking screw 88, where the joining force is strong, but a spatial conflict easily occurs in the vertical direction, so the second support plate 19 may be disposed above a thinner component of the portable electronic device 9 or above a place where elements are arranged less tightly.

Consequently, the first support plate 17 and the second support plate 19 are used in combination, so that the flexibility of assembling a keyboard can be increased greatly, and designers can arrange the spatial configuration of elements of the portable electronic device 9 more flexibly, thereby optimizing the system design.

Figure 3:
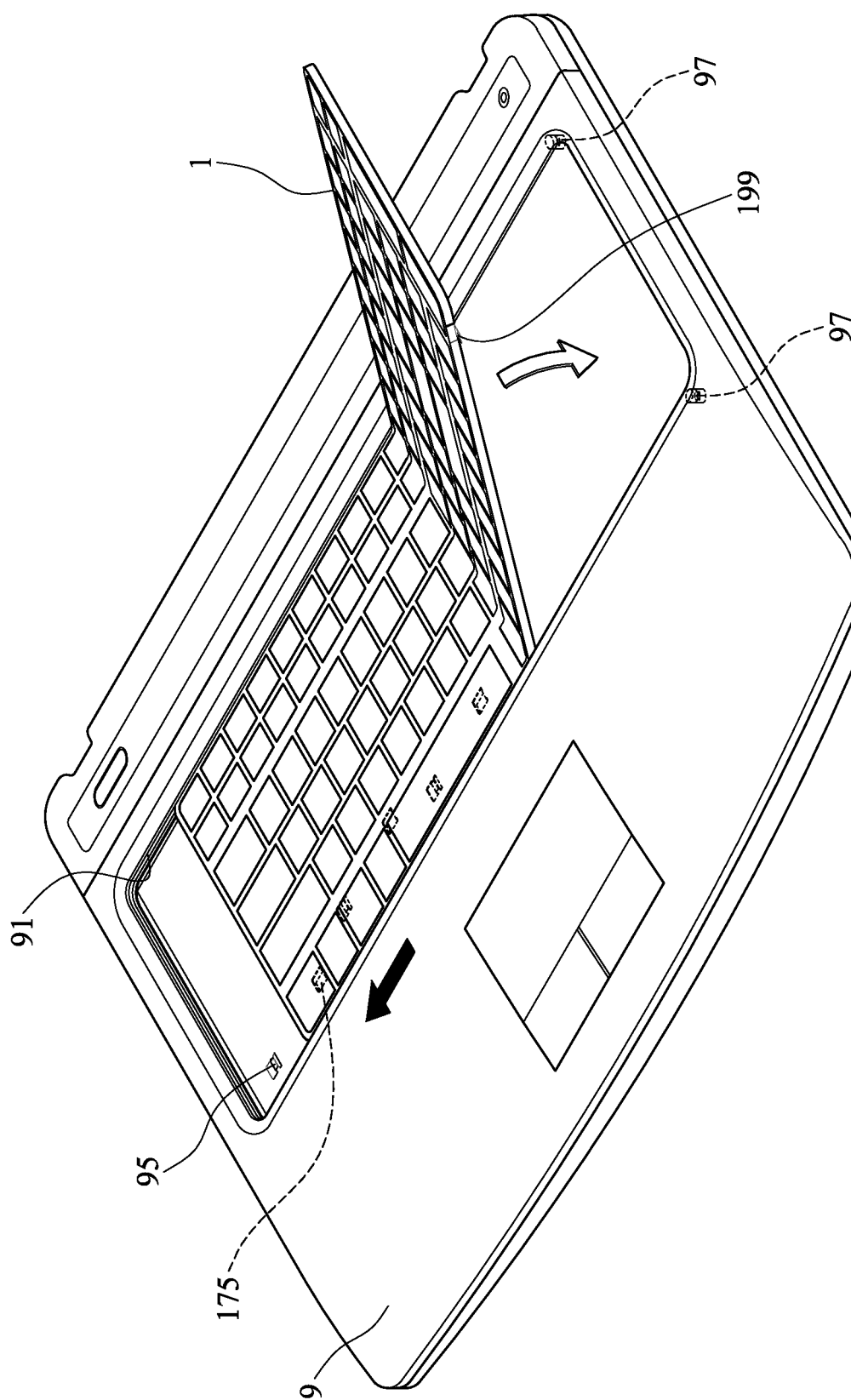
FIG. 3 is a schematic view (1) of a method for assembling a keyboard of the present invention.
Figure 4:
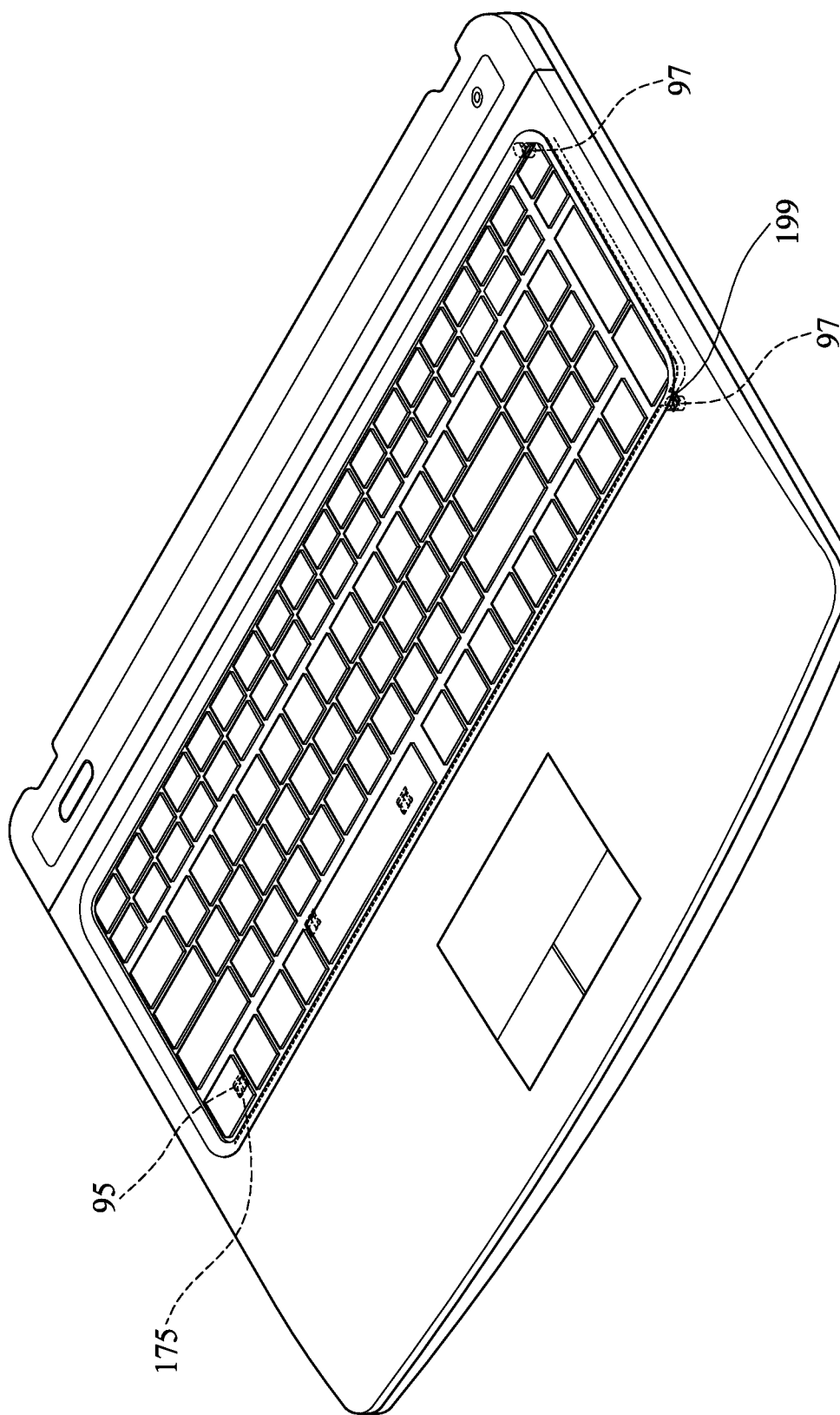
FIG. 4 is a schematic view (2) of a method for assembling a keyboard of the present invention.

FIG. 3 is a schematic view (1) of the assembling of a keyboard according to the present invention. FIG. 4 is a schematic view (2) of the assembling of a keyboard according to the present invention. Please refer to FIG. 3 and FIG. 4, in which the process of assembling a keyboard is disclosed.

As shown in FIG. 3, when the keyboard 1 is intended to be assembled on the portable electronic device 9, the keyboard 1 is bent along the flat edge 171 of the first support plate 17 or the flat edge 191 of the second support plate 19, so that an angle is formed between the second support plate 19 and the first support plate 17. The size of the angle is determined according to assembling requirements, that is, as long as the two convex edges 172 and 174 of the first support plate 17 can slide into the two trenches 91 or as long as the second extension portion 175*b* of the hook 175 can be locked in the hole 95, which is not specially limited in this embodiment.

As shown in FIG. 4, after the two convex edges 172 and 174 of the first support plate 17 slide into the two trenches 91 or as long as the second extension portion 175*b* of each hook 175 slides into and is locked in the hole 95, the second support plate 19 may be placed flat. Then, through a plurality of locking holes 97 (two locking holes in FIG. 4), disposed on the portable electronic device and locking pieces 199 corresponding the locking holes 97 and located on the periphery of the second support plate 19, the second support plate 19 is fixedly connected onto the portable electronic device 9 in a locked manner. In this way, the assembling of the keyboard is completed.

Since a bendable keyboard is used in the foregoing method for assembling a keyboard, compared with the conventional method for assembling a keyboard, the method for assembling a keyboard of the present invention provides system designers with high flexibility in element configuration and makes a portable electronic device thinner and narrower.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A keyboard, applicable to a portable electronic device, comprising:
   a flexible circuit board, having a first surface and a second surface opposite the first surface, wherein the first surface is arranged with a plurality of electronic elements;
   a plurality of keys, disposed on the first surface and electrically connected to the plurality of electronic elements on the flexible circuit board;
   a flexible frame, disposed on the first surface and having a plurality of through holes for the keys to pass through;
   a first support plate, disposed on the second surface, and a part of a periphery of the first support plate being connected to the flexible frame, wherein the first support plate has a flat edge; and
   a second support plate, disposed on the second surface and adjacent to the first support plate, and a part of a periphery of the second support plate being connected to the flexible frame, wherein the second support plate has a flat edge;
   wherein the flexible frame is configured to be bent along the flat edge of the first support plate or the flat edge of the second support plate.

2. The keyboard according to claim 1, wherein a size of the first support plate is different from a size of the second support plate.

3. The keyboard according to claim 1, wherein the first support plate is rectangular and has three convex edges, the three convex edges extend in a thickness direction of the first support plate and are connected to the flexible frame, and the flat edge is opposite the second support plate.

4. The keyboard according to claim 3, wherein the second support plate is rectangular and has three convex edges, the three convex edges of the second support plate extend in a thickness direction of the second support plate and are connected to the flexible frame, and the flat edge of the second support plate is opposite the flat edge of the first support plate.

5. A combination of keyboard and portable electronic device, comprising:
   a keyboard, including:
      a flexible circuit board, having a first surface and a second surface opposite the first surface, wherein the first surface is arranged with a plurality of electronic elements;
      a plurality of keys, disposed on the first surface and electrically connected to the plurality of electronic elements on the flexible circuit board;
      a flexible frame, disposed on the first surface and having a plurality of through holes for the keys to pass through;
      a first support plate, disposed on the second surface, and a part of a periphery of the first support plate being connected to the flexible frame, wherein the first support plate is rectangular and has three convex edges and a flat edge, the three convex edges extend in a thickness direction of the first support plate and are connected to the flexible frame, and the flat edge is opposite the second support plate; and
      a second support plate, disposed on the second surface and adjacent to the first support plate, and a part of a periphery of the second support plate being connected to the flexible frame, wherein the second support plate is rectangular and has three convex edges and a flat edge, the three convex edges of the second support plate extend in a thickness direction of the second support plate and are connected to the flexible frame, and the flat edge of the second support plate is opposite the flat edge of the first support plate;
      wherein the flexible frame is configured to be bent along the flat edge of the first support plate or the flat edge of the second support plate; and
   a portable electronic device, having an opening and two trenches parallel to each other, wherein the two trenches are disposed on the periphery of the opening, and two convex edges of the first support plate are parallel to each other and are used to slide into the two trenches.

6. A combination of keyboard and portable electronic device, comprising:
   a keyboard, including:
      a flexible circuit board, having a first surface and a second surface opposite the first surface, wherein the first surface is arranged with a plurality of electronic elements;
      a plurality of keys, disposed on the first surface and electrically connected to the plurality of electronic elements on the flexible circuit board;

a flexible frame, disposed on the first surface and having a plurality of through holes for the keys to pass through;

a first support plate, disposed on the second surface, and a part of a periphery of the first support plate being connected to the flexible frame, wherein the first support plate is rectangular and has three convex edges and a flat edge, the three convex edges extend in a thickness direction of the first support plate and are connected to the flexible frame, and the flat edge is opposite the second support plate; and a second support plate, disposed on the second surface and adjacent to the first support plate, and a part of a periphery of the second support plate being connected to the flexible frame, wherein the second support plate is rectangular and has three convex edges and a flat edge, the three convex edges of the second support plate extend in a thickness direction of the second support plate and are connected to the flexible frame, and the flat edge of the second support plate is opposite the flat edge of the first support plate;

wherein the flexible frame is configured to be bent along the flat edge of the first support plate or the flat edge of the second support plate; and a portable electronic device, having an opening and a fixing piece, wherein the fixing piece is disposed at the opening, the surface of the fixing piece is provided with a plurality of holes, and the first support plate comprises a plurality of hooks corresponding to the holes.

7. The combination of keyboard and portable electronic device according to claim 6, wherein each hook has a first extension portion and a second extension portion, the first extension portion extends a first distance in a direction substantially perpendicular to the first support plate and is connected to an end of the second extension portion, the second extension portion extends a second distance in the direction substantially parallel to the first support plate.

8. The combination of keyboard and portable electronic device according to claim 7, wherein the second distance is in a range from 5 mm to 15 mm.

9. A method for assembling a keyboard on a portable electronic device, comprising:

providing the keyboard, wherein the keyboard comprises a flexible circuit board having a first surface and a second surface opposite the first surface, wherein the first surface is arranged with a plurality of electronic elements, a plurality of keys being disposed on the first surface and electrically connected to the plurality of electronic elements on the flexible circuit board, a flexible frame being disposed on the first surface and having a plurality of through holes for the keys to pass through, a first support plate being disposed on the second surface, and a part of a periphery of the first support plate being connected to the flexible frame, and a second support plate being disposed on the second surface and adjacent to the first support plate, and a part of a periphery of the second support plate being connected to the flexible frame;

providing the portable electronic device, wherein the portable electronic device has an opening and two trenches parallel to each other, wherein the two trenches are disposed on the periphery of the opening, and two convex edges of the first support plate are parallel to each other and are used to slide into the two trenches;

bending the keyboard along the flat edge of the first support plate or the flat edge of the second support plate, so that an angle is formed between the second support plate and the first support plate;

sliding two convex edges parallel to each other of the first support plate into two trenches of the portable electronic device;

making the first support plate and the second support plate level with each other; and fixing the second support plate to the portable electronic device.

10. A method for assembling a keyboard on a portable electronic device, comprising:

providing the keyboard, wherein the keyboard comprises a flexible circuit board having a first surface and a second surface opposite the first surface, wherein the first surface is arranged with a plurality of electronic elements, a plurality of keys being disposed on the first surface and electrically connected to the plurality of electronic elements on the flexible circuit board, a flexible frame being disposed on the first surface and having a plurality of through holes for the keys to pass through, a first support plate being disposed on the second surface, and a part of a periphery of the first support plate being connected to the flexible frame, and a second support plate being disposed on the second surface and adjacent to the first support plate, and a part of a periphery of the second support plate being connected to the flexible frame;

providing the portable electronic device, wherein the portable electronic device has an opening and a fixing piece, wherein the fixing piece is disposed at the opening, the surface of the fixing piece is provided with a plurality of holes, and the first support plate comprises a plurality of hooks corresponding to the holes;

bending the keyboard along the flat edge of the first support plate or the flat edge of the second support plate, so that an angle is formed between the second support plate and the first support plate;

sliding each hook into each hole;

making the first support plate and the second support plate level with each other; and fixing the second support plate onto a fixing piece.

11. A method for assembling a keyboard on a portable electronic device, comprising:

providing the keyboard, wherein the keyboard comprises a flexible circuit board having a first surface and a second surface opposite the first surface, wherein the first surface is arranged with a plurality of electronic elements, a plurality of keys being disposed on the first surface and electrically connected to the plurality of electronic elements on the flexible circuit board, a flexible frame being disposed on the first surface and having a plurality of through holes for the keys to pass through, a first support plate being disposed on the second surface, and a part of a periphery of the first support plate being connected to the flexible frame, and a second support plate being disposed on the second surface and adjacent to the first support plate, and a part of a periphery of the second support plate being connected to the flexible frame;

providing the portable electronic device, wherein the portable electronic device has an opening and a fixing piece, wherein the fixing piece is disposed at the opening, the surface of the fixing piece is provided with a plurality of holes, and the first support plate comprises a plurality of hooks corresponding to the holes, wherein each hook has a first extension portion and a second extension portion, the first extension portion extends a first distance in a direction substantially perpendicular to the first support plate and is connected to an end of the second extension portion, the second extension portion extends a second distance in the direction substantially parallel to the first support plate;

bending the keyboard along the flat edge of the first support plate or the flat edge of the second support plate, so that an angle is formed between the second support plate and the first support plate;

sliding each hook into each hole;

making the first support plate and the second support plate level with each other; and fixing the second support plate onto a fixing piece.

12. A method for assembling a keyboard on a portable electronic device, comprising:

providing the keyboard, wherein the keyboard comprises a flexible circuit board having a first surface and a second surface opposite the first surface, wherein the first surface is arranged with a plurality of electronic elements, a plurality of keys being disposed on the first surface and electrically connected to the plurality of electronic elements on the flexible circuit board, a flexible frame being disposed on the first surface and having a plurality of through holes for the keys to pass through, a first support plate being disposed on the second surface, and a part of a periphery of the first support plate being connected to the flexible frame, and a second support plate being disposed on the second surface and adjacent to the first support plate, and a part of a periphery of the second support plate being connected to the flexible frame;

providing the portable electronic device, wherein the portable electronic device has an opening and a fixing piece, wherein the fixing piece is disposed at the opening, the surface of the fixing piece is provided with a plurality of holes, and the first support plate comprises a plurality of hooks corresponding to the holes, wherein each hook has a first extension portion and a second extension portion, the first extension portion extends a first distance in a direction substantially perpendicular to the first support plate and is connected to an end of the second extension portion, the second extension portion extends a second distance in the direction substantially parallel to the first support plate, wherein the second distance is in a range from 5 mm to 15 mm;

bending the keyboard along the flat edge of the first support plate or the flat edge of the second support plate, so that an angle is formed between the second support plate and the first support plate;

sliding each hook into each hole;

making the first support plate and the second support plate level with each other; and fixing the second support plate onto a fixing piece.

* * * * *